Sept. 22, 1964 A. E. NEWTON 3,149,522
AUTOMATIC TALLY CUTTING PRESS
Filed April 14, 1961 10 Sheets-Sheet 1

*Inventor*
*Albert E. Newton*
*By his Attorney*
*George C. Fuller*

Sept. 22, 1964                A. E. NEWTON                3,149,522
                        AUTOMATIC TALLY CUTTING PRESS
Filed April 14, 1961                                10 Sheets—Sheet 2
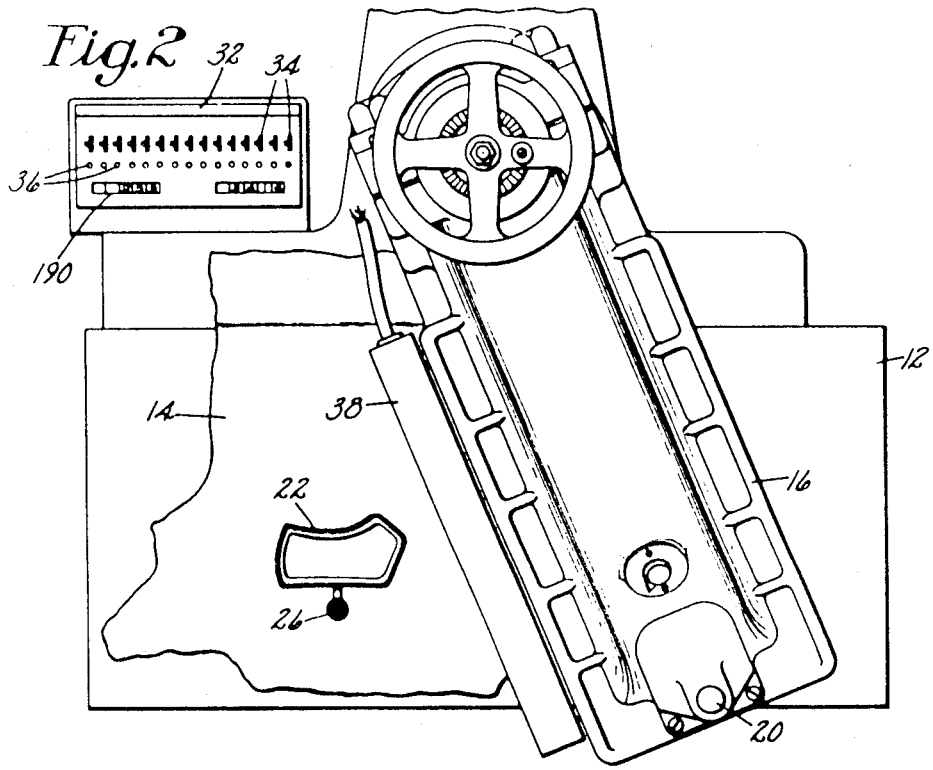
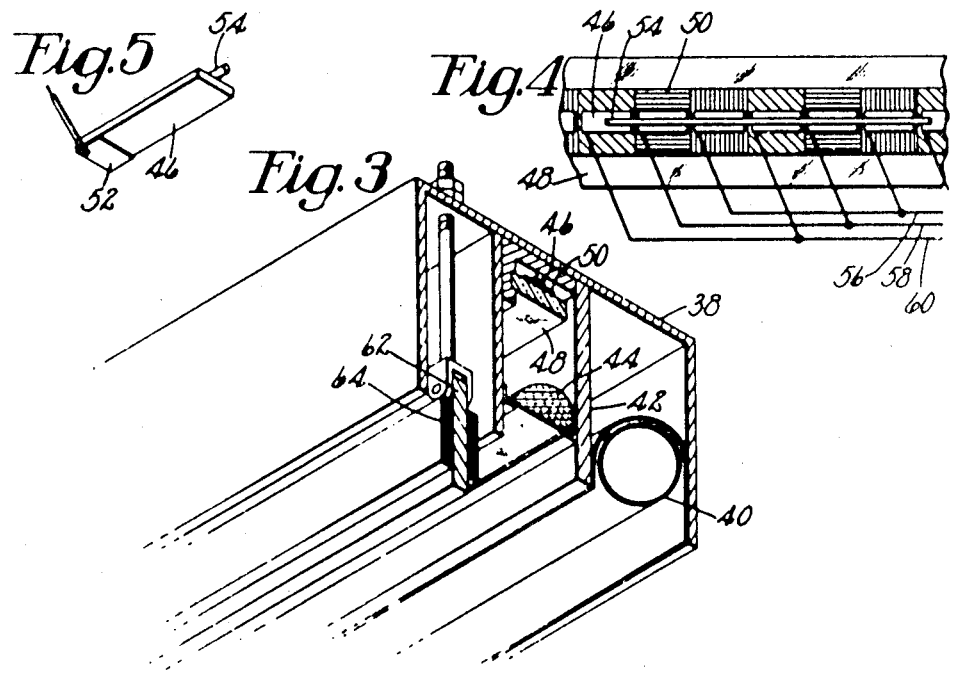

Sept. 22, 1964     A. E. NEWTON     3,149,522
AUTOMATIC TALLY CUTTING PRESS
Filed April 14, 1961     10 Sheets-Sheet 3
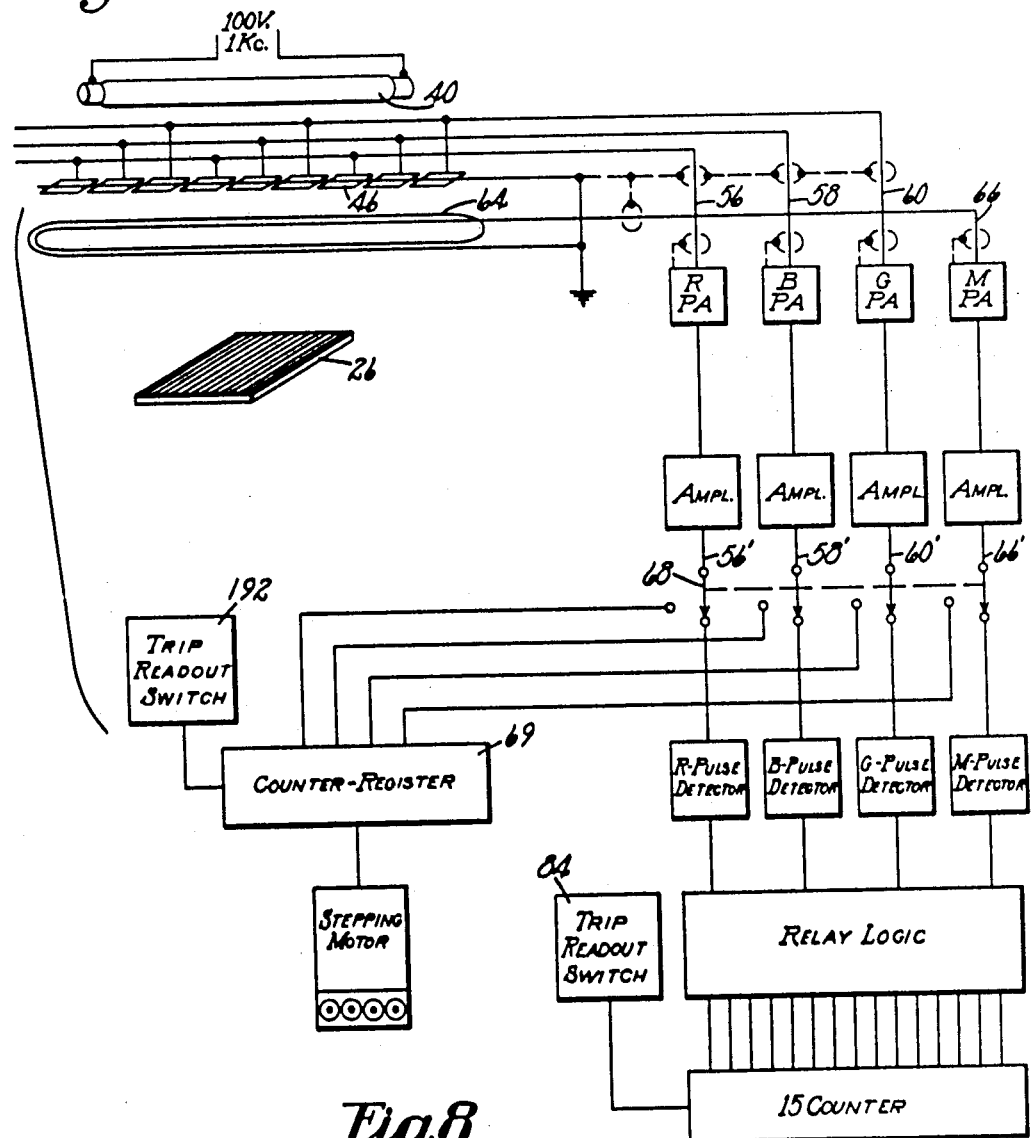
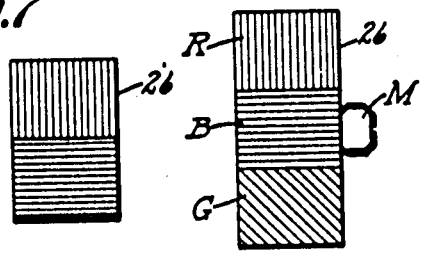

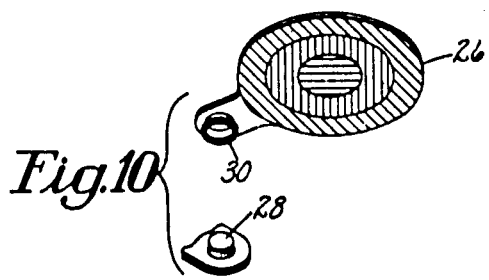
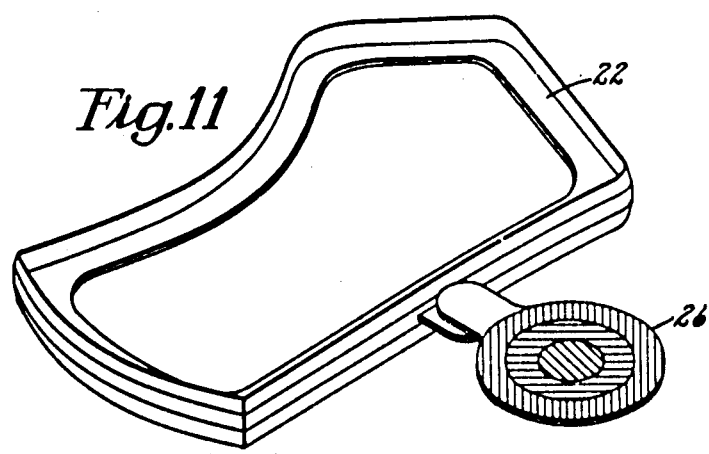
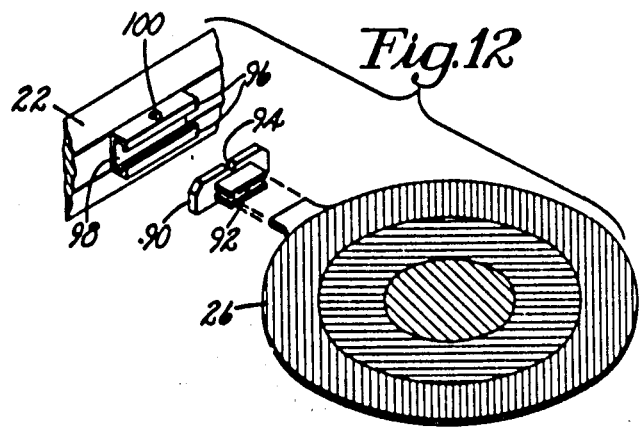

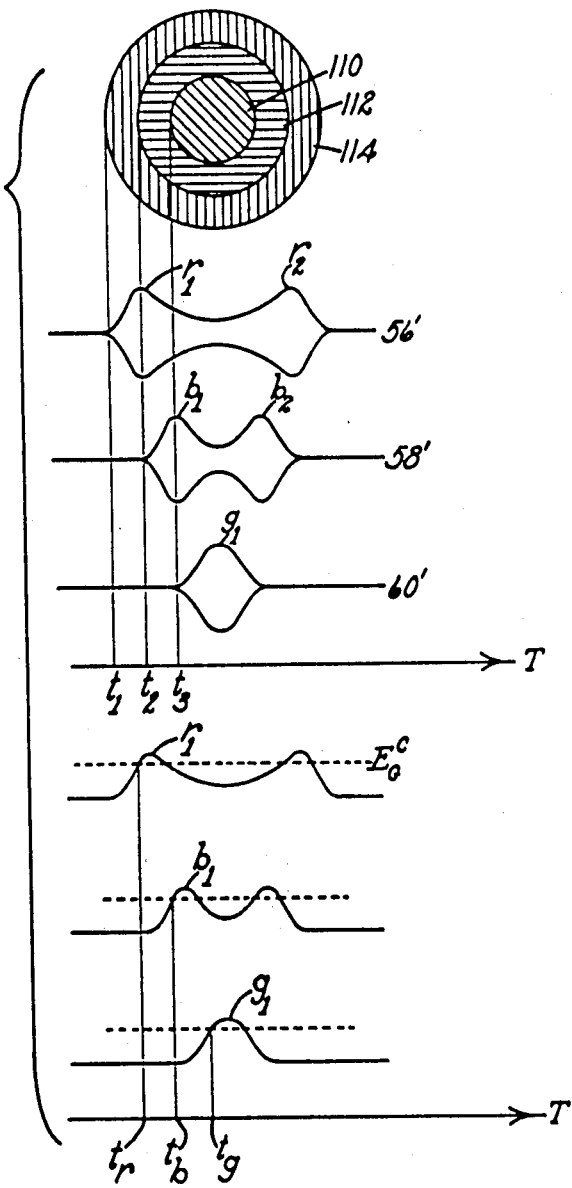

United States Patent Office 3,149,522
Patented Sept. 22, 1964

3,149,522
AUTOMATIC TALLY CUTTING PRESS
Albert E. Newton, Beverly, Mass., assignor to United Shoe Machinery Corporation, Flemington, N.J., a corporation of New Jersey
Filed Apr. 14, 1961, Ser. No. 103,098
7 Claims. (Cl. 83—522)

This invention relates to cutting presses of the type commonly referred to as clickers and more particularly to apparatus for use with such presses for automatically tallying the production thereof. The invention is illustrated as embodied in a cutting press of the type disclosed in United States Letters Patent No. 2,788,070, granted April 9, 1957, on an application filed in the name of Seabury II et al. for keeping a running tally either of the number of cuts made from sheet material with each of a plurality of different dies, or of the total area of the cut portions of sheet material. It will be understood, however, that the invention in many of its novel aspects is not limited to use with machines of the type herein illustrated.

The cutting press or clicker disclosed in the patent is adapted for cutting shaped parts out of sheet material by pressing through it and into a cutting block a freely movable die having a sharp cutting edge defining the periphery of the part to be cut. In present shoe factory practice, a clicker operator receives his work orders in the form of work tickets calling for the cutting of a given number of specified parts which may differ in kind and size, each different part having a corresponding die. For example, a ticket may call for the cutting out of specified numbers of inside and outside quarters, vamps and tips, each in a number of different sizes. The operator draws a number of pieces of leather representing what he judges to be a suitable area of material and cuts the pieces into the required shoe parts by laying the pieces one at a time on the cutting block of the clicker and using it repeatedly to press cutting dies through selected areas of the pieces. The amount of waste produced by this process depends to a great extent on the skill of the operator in judiciously selecting dies of suitable size and shape in optimum disposition and sequence. In addition to planning his cutting pattern, the operator has heretofore been required to keep track of the number of different shoe parts which he has cut to insure final agreement between the parts cut out and the parts specified in the ticket. Since the time used by the operator in counting his production fails to employ the operator's highest skills, it becomes highly desirable that means be provided automatically to keep track of production on each cutting order represented by a ticket.

Accordingly, an important object of the present invention is to provide apparatus adapted for use with a cutting press of the aforementioned type for keeping a running tally of the production on a work order by counting and indicating the number of cuts made with individual dies and for warning the operator when enough parts of a given kind have been cut.

Since the amount of wastage produced by an operator in cutting out parts of a given total area is of interest in the promotion of cutting efficiency, it is desirable that means be provided for keeping a running total of the area of sheet material represented by the pieces cut for comparison with the area of sheet material drawn from stock. For example, an operator may estimate from the work ticket the required area of upper leather needed to cut out the parts and draw the leather from stock in the form of three separate pieces, each piece having previously been marked to indicate its area. As the operator completes the cutting of each piece, a comparison of the piece area with the area of the cut shoe parts, hereinafter referred to as the "yield total" will indicate his cutting efficiency.

It is accordingly an object of the present invention to provide apparatus which will automatically tally the running total of the yield, that is, the area of shoe parts cut by the operator by totalizing and indicating the sum of the individual areas cut during a given production run.

To these ends, and in accordance with a feature of the present invention, there is provided tallying apparatus comprising a reader for sensing coded data designations carried by the dies and for storing data from such sensing and an indicator controlled jointly by the reader and by the stroke trip means of the press to manifest the data as the press is operated. The reader has a scanner mounted on the press beam for sensing the data designations carried by the dies, as illustrated, on index tags affixed thereto, and a storage register controlled by signals from the scanner for storing the information received in the form of a group of signals from the scanner. The term "word" is used herein to signify a group of scanner signals handled as a unit in the apparatus and resulting from the sensing of a given data designation. The register may interpret or translate the word received from the scanner in accordance with the data designation code prior to storage or it may store the word substantially as received and translate the word into language appropriate for controlling the indicator upon receiving a read out signal.

Other features and advantages of the invention will best be understood by reference to the specification taken in connection with the accompanying drawings, in which:
 FIG. 1 is an angular view of a cutting machine embodying the present invention;
 FIG. 2 is a plan view of the machine shown in FIG. 1;
 FIG. 3 is an upward angular view on an enlarged scale of a portion of the apparatus shown in FIG. 2;
 FIG. 4 is a plan view of a portion of the apparatus shown in FIG. 3;
 FIG. 5 is an angular view on a further enlarged scale of a portion of the apparatus shown in FIG. 4;
 FIG. 6 is a diagram illustrating the operational relation of an index tag and tag reading and tallying portions of the illustrative apparatus;
 FIGS. 7 and 8 illustrate other index tags based on color-magnetic combination code;
 FIG. 9 is a schematic of a relay logic and counter circuit shown in FIG. 6;
 FIGS. 10 and 11 illustrate another form of index tag and a means of attaching such tags to cutting dies;
 FIG. 12 is an exploded view comprising an angular view of a portion of a cutting die and means for attaching an index tag thereto;
 FIGS. 13, 14 and 15 illustrate various forms of data designations in concentric circular index area code and corresponding electric voltage wave forms derived therefrom during sensing by the apparatus of the present invention;

Figure 1:
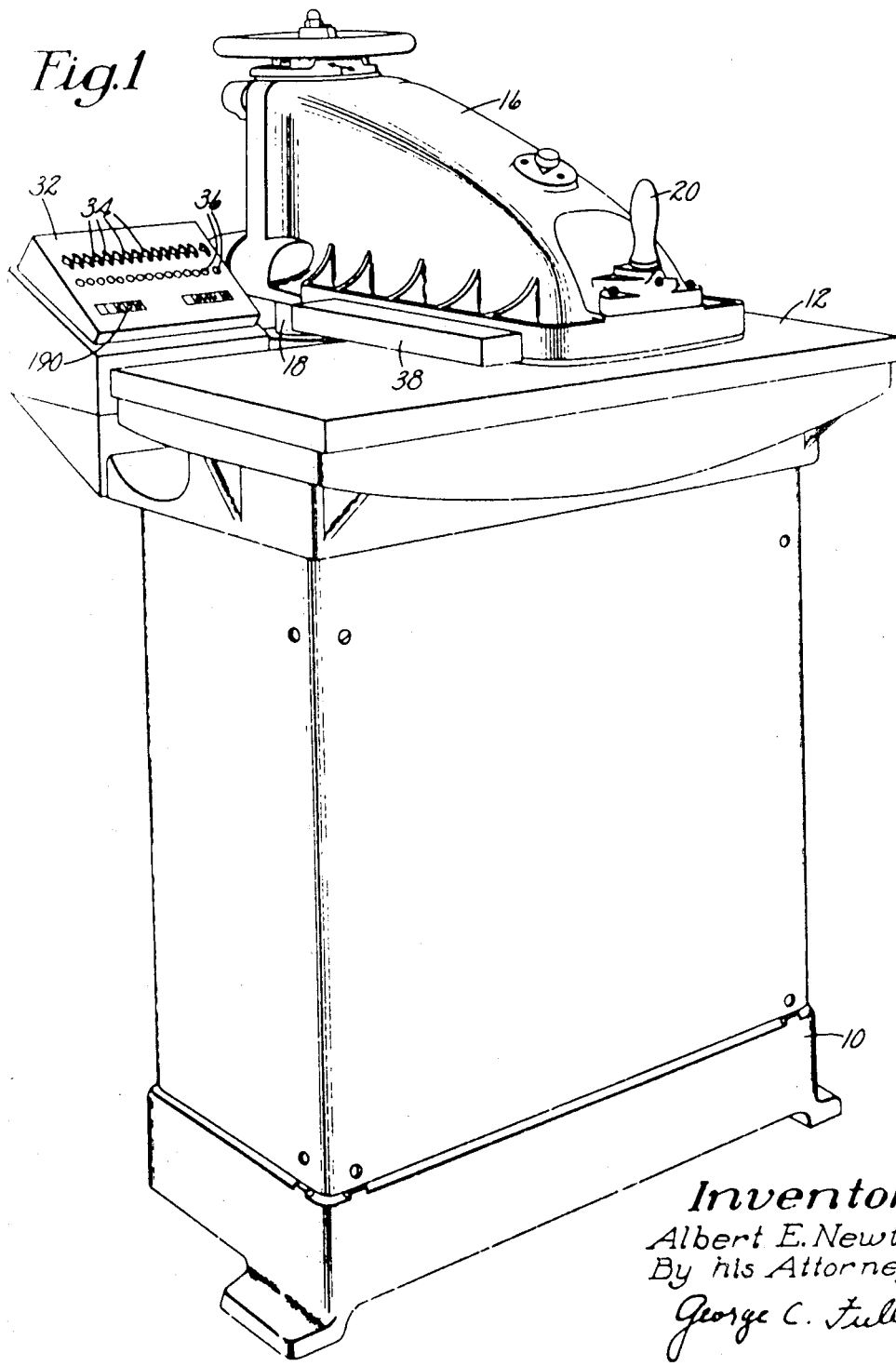

Referring to the drawings, the illustrative machine comprises a frame 10 carrying a cutting pad 12 for supporting sheet material such as a leather workpiece 14. A beam 16 is supported on a post 18 for swinging over the pad and for movement toward and away from the pad by a fluid pressure motor (not shown). A trip means operates in response to downward movement of a handle 20 to cause the beam 16 to be moved toward the cutting pad 12 in a cutting stroke terminated in normal operation when a die 22 is forced through the workpiece 14 into engagement with the cutting pad 12. For a more detailed description of the fluid pressure motor and its control circuits, reference may be had to United States Letters Patent No. 2,783,838, granted March 5, 1957, on an application filed in the names of Roy G. Ericson and Frank E. Stratton.

According to the present invention, the die 22 carries a data designation identifying the die, the designation conveniently being disposed on a detachable index tag 26 as shown in FIG. 10. The data designation is suitably formed with fluorescent material in accordance with one of a variety of codes hereinafter discussed more fully. The fluorescent materials employed are adapted upon excitation with modulated ultraviolet light to emit similarly modulated light at characteristic colors or wave lengths and the data designations may thus comprise different combinations of color areas.

At the left rear of the machine, as seen in FIGS. 1 and 2, is a tally indicator comprising a bank 32 of counters 34 each having associated therewith a red warning light 36. As described more fully hereinafter, the data designation carried on an index tag by a die making a cut is sensed and the information stored by a reader and the counters are selectively operated in accordance with this information upon each actuation of the handle 20. Suitably, the counters are arranged to count down from a preset number set in from a word ticket and indicate the cuts remaining to be made while the warning light is controlled by circuitry to be turned on when an associated counter indicates that no more of its assigned cuts are to be made.

For the purpose of sensing a data designation on an index tag, an elongated scanner 38 is mounted at one side of the beam 16 where it will be passed over a die and tag as the operator swings the beam from a rest position in which the front of the beam is to the right of the cutting pad 12 to its operative position over the die on the workpiece supported on the cutting pad 12. As seen in FIG. 3, the scanner 38 comprises an elongated ultraviolet lamp 40 arranged to be excited from a source of 1 kc./s. alternating current (not shown) to provide a modulated output.

Adjacent the lamp 40 and shielded therefrom by an intermediate web 42 is an optical system comprising a semi-cylindrical lens 44 and, spaced therefrom by approximately its focal length, an array of photoelectric cells 46. The lamp, the lens and the array extend a greater portion of the length of the scanner 38. Between the lens and the array of photocells 46 is disposed an infrared filter which prevents spurious response by the photocells from such radiation. Cemented to the upper surface of the filter 48 is a plurality of gelatin filters 50 arranged in successive groups of the three different colors, red, blue and green, as indicated in FIG. 4 by the hatching. These filters are chosen selectively to transmit one of the three colors of radiation emitted by the fluorescent material employed to provide the data designations on the index tags. The cells 46 may be of any suitable type but are herein shown as photovoltaic "solar" photocells in which the negative terminal comprises the entire rear surface while the positive terminals of the cells comprise a short conductive element 52 at the front surface (FIG. 5). The rear surface of the cells is tinned and the cells conveniently are mounted by soldering the rear surfaces of the cells to a negative bus 54 as shown in FIG. 4. The positive terminals of cells associated with red, blue and green filters are connected respectively to buses 56, 58 and 60. Extending along the other side of the scanner from the lamp 40 is an elongated core 62 carrying a horizontal coil winding 64 in which a voltage is induced when the beam is swung over an index tag carrying a permanent magnet.

Figure 9:
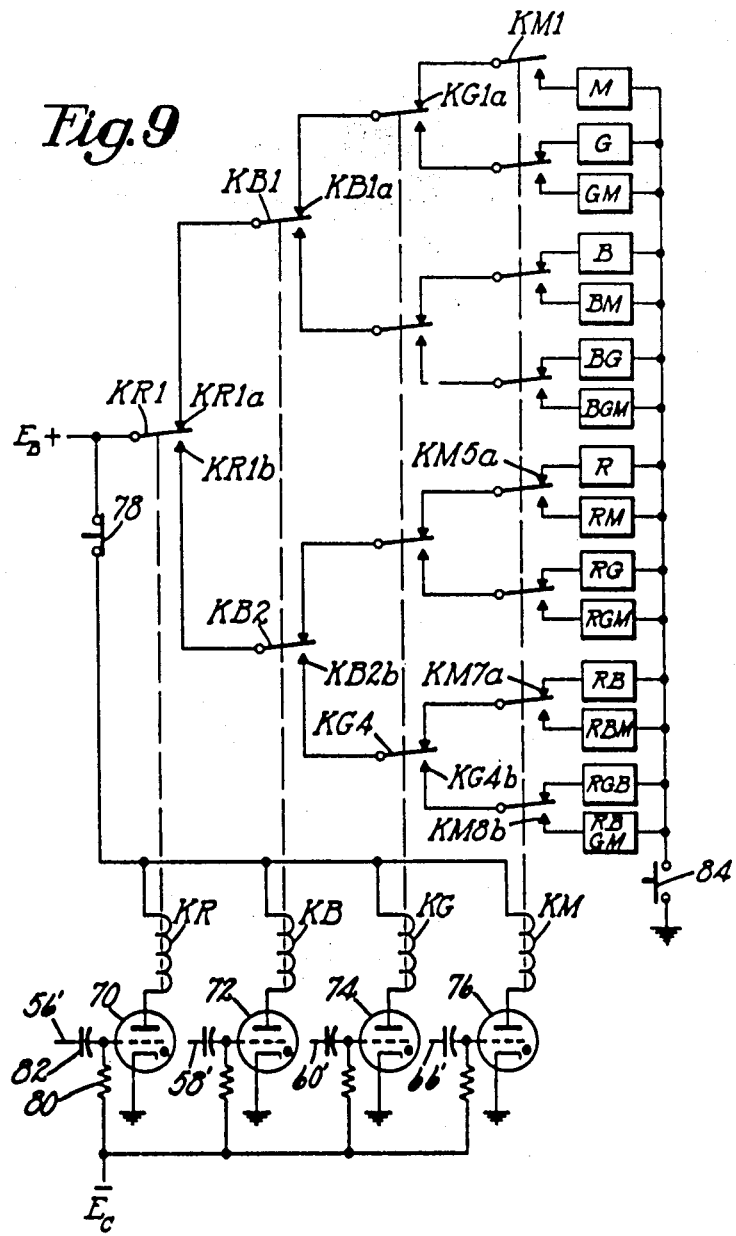

Referring to FIGS. 6 and 9, each of the buses 56, 58 and 60 and a bus 66 from the winding 64 is connected through shielding to the input of an A.C. preamplifier-amplifier combination having an ungrounded output lead referenced by a prime numeral corresponding to the reference numeral of the input bus. The output leads are connected to the arms of a four-pole double-throw switch 68 by which the leads may be connected either to a counter register 69 for yield totalizing or (as shown) to a die-counting circuit. In the illustrated position of the switch 68 the output of the amplifiers is directed to an interpreting storage register comprising a pulse-detecting thyratron switching and relay logic circuit. This circuit comprises four thyratrons 70, 72, 74 and 76 having in their anode circuits, respectively, the windings of the relays KR, KB, KG and KM. A normally closed reset switch 78, which suitably may be arranged for actuation by swinging the beam 16 to its rest position for changing dies, is connected between the windings and a source of positive voltage $E_n{}^+$. The thyratrons are biased nonconductive by connection of their grids through resistors 80 to a source of bias voltage $E_G{}^-$, the grids being coupled through capacitors 82 to the leads 56', 58', 60' and 66'. The contacts of the relays are connected in a pyramid network, the root KR1 of which is connected to the positive voltage source $E_n{}^+$ while the ultimate branch contacts, those of the relay KM, are connected to ground through the counters 34 and a normally open count or readout switch 84 operated by the handle 20.

With none of the thyratrons conducting, the relays form a path from the root at KR1 through KR1a, KB1a and KG1a to KM1 where it terminates in an open switch. When the beam is swung over a die carrying the red fluorescent tag shown in FIG. 6, the tag will be illuminated by the lamp 40, which, energized with 1 kc./s. alternating current, flickers at the rate of 2,000 times per second. The photocells 46 behind the red filters will put out a corresponding 2 kc./s. A.C. signal on the bus 56 which is amplified and supplied via the lead 56' to fire the thyratron 70. The relay KR then transfers KR1 to KR1b forming a path from KR1 to KM5a connected to the counter for plain red. Then when the count switch 84 is closed by actuation of the handle 20 in initiating a cutting stroke, the counter is energized from $E_n{}^+$ to ground. Opening the reset switch 78 deenergizes the thyratron 70 by interrupting its anode supply.

If the red and blue index tag of FIG. 7 were sensed, the relays KR and KB would be energized and the circuit would extend through KR1b, KB2b to KM7a. Similarly sensing the red, blue and green tag with magnet M, shown in FIG. 8, would close a path from KR1 to KM8b.

Accordingly, it will be seen that the circuit is adapted to interpret the signals from the scanner by establishing on a logical basis in accordance with the combination code a condition for each of fifteen inputs corresponding to fifteen different color and magnet combinations, and to store the data in this form for use when called for in the operation of the clicker by closure of the count switch 84.

FIGS. 10 and 11 show an index tag 26 attached to a webbed die 22 by means of a snap fastener having mating portions 28 and 30. FIG. 12 shows how an index tag may be attached to a webless die. Here a member 90 having a slot 92 for receiving the tag and a notch 94 on one edge is received between overlapping flanges 96 of a mating member 98. A dimple 100 prick-punched in one flange of the member 98 cooperates with the notch 94 releasably to retain the members in mating relation.

FIG. 13 illustrates output signals provided on the three buses 56', 58' and 60' by response to relative movement therewith of data designations comprising center dots and circular outer areas or bands of different colors. As the scanner passes over the designation shown in FIG. 13 comprising a green dot 110, a blue band 112 and a red band 114, the scanner will first pick up red light from the outer edge of the band 114, at time $t_1$. As the scanner continues over the tag, next blue and green light at times $t_2$ and $t_3$ will be directed on the array producing A.C. voltage signals at 2 kc. on the leads 56', 58' and 60' in the relation shown by their envelopes in the first three wave forms of FIG. 13. It will be noted that the bands produce two peaks $r_1$, $r_2$ and $b_1$, $b_2$ while the dot produces one peak $g_1$.

The lower three wave forms of FIG. 13 illustrate how the D.C. envelopes of the signals produced in scanning the data designation shown therein may be related with the critical or firing grid voltages $E_0^c$ of thyratrons, connected as shown in FIG. 9, to effect a time sequence in the firing of the thyratrons at times $t_r$, $t_b$ and $t_g$.

Figure 14:
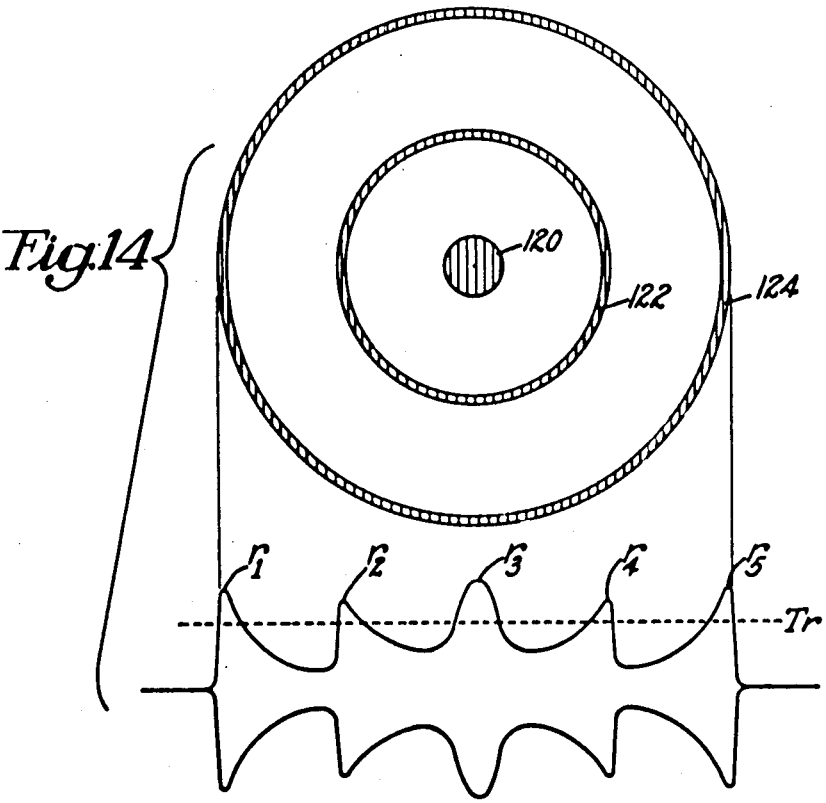
Figure 15:
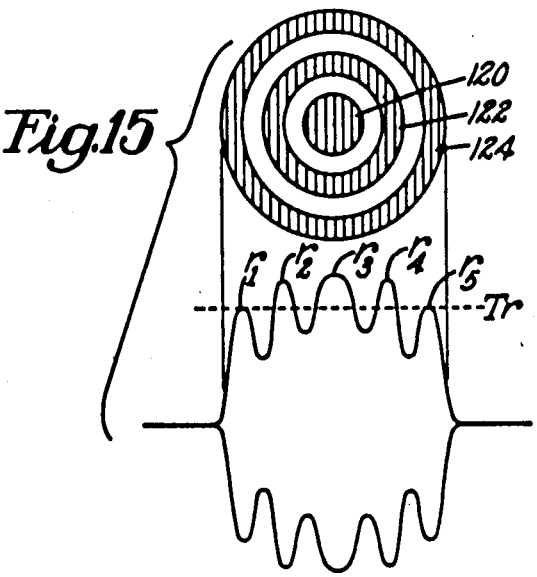

FIGS. 14 and 15 illustrate output signals produced on one lead by the scanner in response to relative movement therewith of data designations comprising circular index areas comprising center dots 120 and outer bands 122 and 124 of fluorescent material of one color, e.g. red, separated by annular spaces in which no fluorescent material is present. It will be seen from the wave form shown in FIG. 15 that where the annular bands of fluorescent material are of the same order of width as the spaces, it is difficult to establish from the peaks $r_1$, $r_2$, $r_3$, $r_4$ and $r_5$ of the envelope a trigger level $T_r$ at which all of the peaks $r_1$ and $r_5$ produced by sensing the outer ring and the peak $r_3$ produced by sensing the center area can reliably be distinguished from the background level. This critically increases with additional outer rings. It will be seen that during the transverse scanning of FIG. 15, the envelope of the wave form which begins at the outer ring with a fairly well defined peak $r_1$, thereafter assumes a form in which the valleys are nearly as high as the original peak so that peaks and valleys become difficult to distinguish electrically with high reliability. However, with a data designation of the form shown in FIG. 14 in which the index area bands are relatively narrow with respect to the spacing therebetween, it will be seen that the wave form produced has peaks of substantially equal height and, accordingly, is much more suitable for controlling a counting circuit having a trigger level $T_r$.

Figure 16:
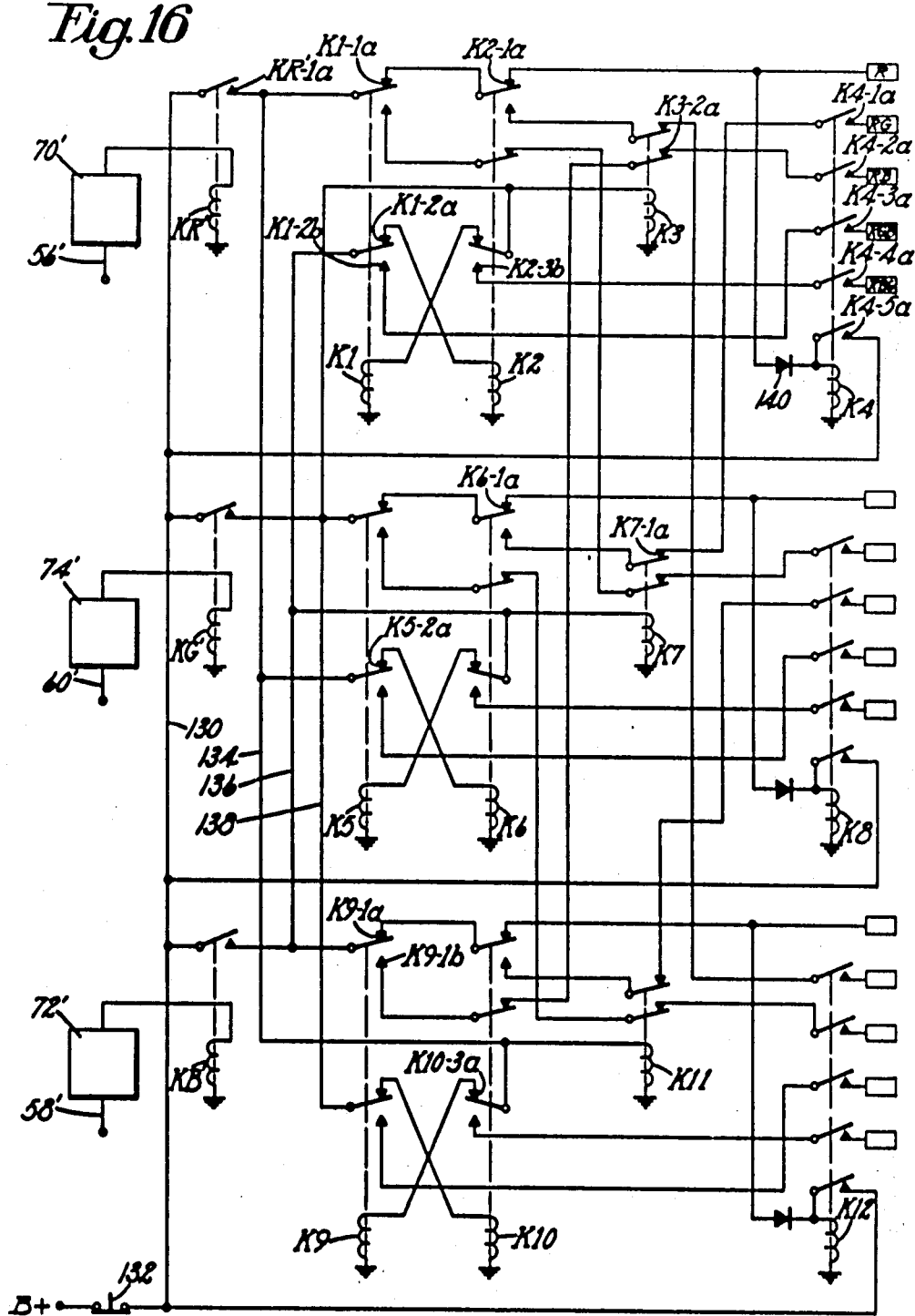
FIG. 16 is a schematic of a relay logic circuit for interpreting electric signals in a color sequence code.

FIG. 16 shows a relay logic circuit suitable for the interpretation of signals from color sequence coded data designations such as the data designation shown in FIG. 13. In this circuit, the signals from the leads 56', 60' and 58' are supplied to thyratrons 70', 74' and 72' respectively, coupled thereto in the manner shown in FIG. 9, the thyratrons having the windings of KR', KG' and KB' connected between their anodes and a lead 130 connected to a source B+ of positive voltage through a reset switch 132 which corresponds to the switch 78 of FIG. 9.

When the thyratron 70' is fired by the sensing of a red signal by the scanner, the relay KR' closes its contact KR'-1a to energize a lead 134, hereinafter referred to as the red trunk, from the source B+. Similarly, upon sensing a blue signal, the thyratron 72' is fired to put a positive voltage on a blue trunk 136 and on sensing a green signal the thyratron 74' is fired to put a positive voltage on a green trunk 138. A relay K4 has five contacts of which one, K4–5a is connected when closed to establish a holding circuit for the relay K4. The other four contacts K4–1a, K4–2a, K4–3a and K4–4a lead to terminals corresponding to color combinations in which the color red appears first, hereinafter referred to as "red-first" combinations. With the sensing of a red signal and closure of contacts KR'–1a, the source B+ is connected through the contacts K1–1a and K2–1a to a terminal R corresponding to the red-alone color and through a diode 140 to the winding of K4 thereby closing all the red-first color combination contacts of K4 although these terminals are not energized at this time. At the same time energization of the red trunk energizes a relay K6 through the contacts K5–2a and a relay K9 through the contacts K10–3a to interrupt the energization circuit to K8 at K6–1a and the energiaztion circuit of the relay K12 at the contact K9–1a. This eliminates from further possible energization the green-alone, the blue-alone and the green-first and blue-first terminals. Energization of the relay K6 connects the red-green terminal to the green trunk 138 so that if this trunk is energized the red-green terminal will be energized. Similarly, the red-blue terminal is connected through contacts K9–1b to the blue trunk 136 so that if this trunk is energized the red-blue terminal will be energized.

Upon sensing thereafter of a blue signal resulting in the energization of the blue trunk 136, the relay K2 is energized through the contacts K1–2a, opening at K2–1a the circuit to the red-alone terminal R, the relay K4 remaining energized through its holding circuit, the circuit to the RG terminal is broken by the opening of the contacts K7–1a, the red-blue terminal is energized from the blue trunk through the contacts K9–1b, the circuit to the RGB terminal remains open at K1–2b and the terminal RBG is connected to the green trunk 138 through the contacts K2–3b.

Upon receipt of a green signal energizing the green trunk 138 the energizing circuit to the RB (red-blue) terminal is broken at the contacts K3–2a while the RBG terminal is energized.

Thus it will be seen in general that the signal from the first received color (color X) results in the interruption of the energization circuits to all terminals other than "X-first" terminals, the energization of the X-alone terminal and the connection of the terminals for the possible X-Y and X-Z color pairs to color trunks corresponding to the secondary colors of the pairs. Upon energization of another color trunk, the corresponding one of the possible pair terminals is energized and the other interrupted while the possible three-color terminal is connected to the remaining trunk for energization thereby. The other three-color signal is eliminated by the occurrence of the wrong secondary color.

Accordingly, it will be seen that the circuit of FIG. 16 is adapted to interpret, by establishing unique circuit paramaters on a logical basis, 15 combinations of pulses produced by the scanner in sweep-sensing an index tag having three colors at different index positions selectively energizing until reset one of fifteen output terminals corresponding to the fifteen different data designations.

The output terminals are connected to the counters 34 and the count switch 84 so that upon actuation of the handle 20 the appropriate counter is moved one step, preferably backward toward zero.

Figure 17:
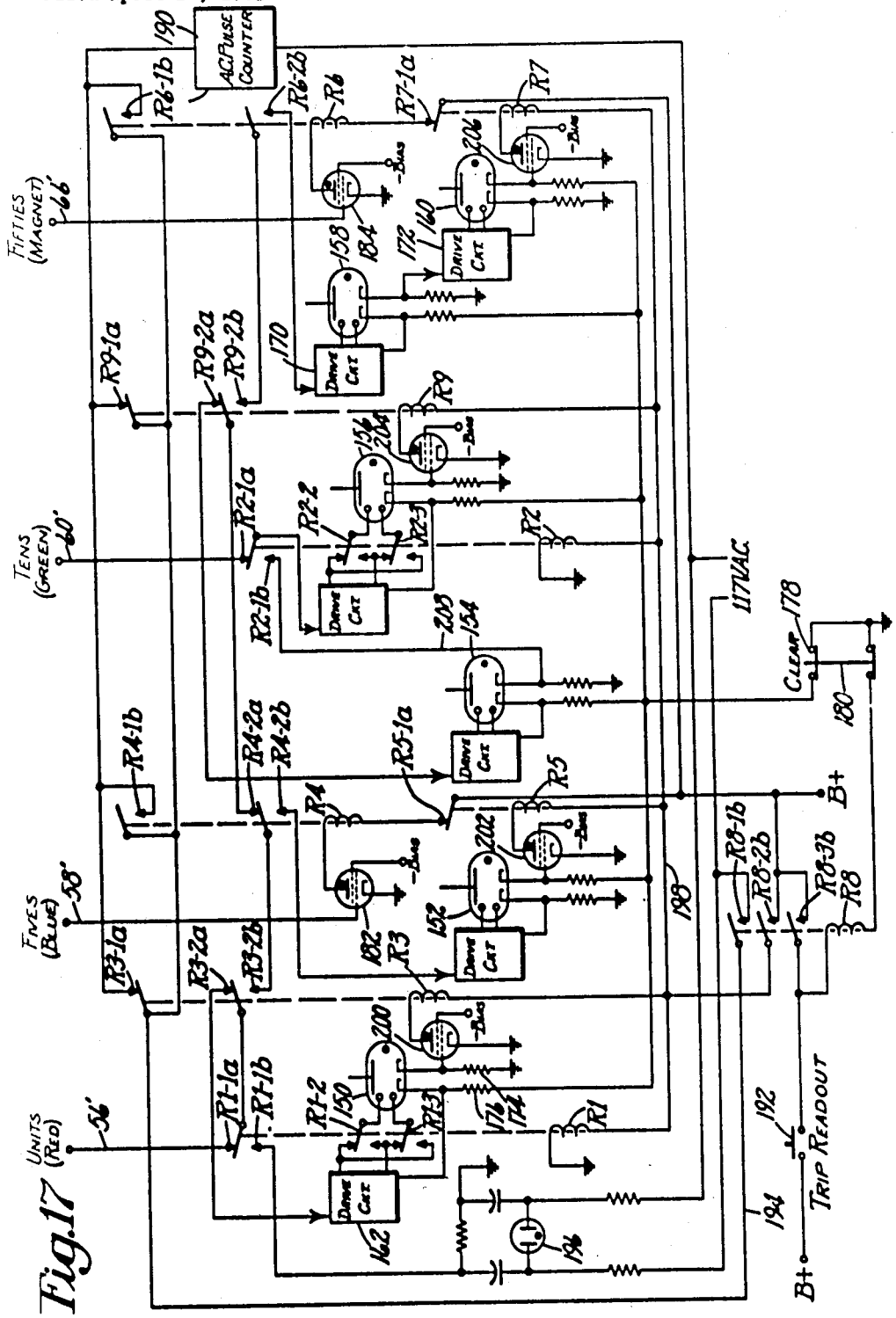
FIG. 17 is a schematic of a counter register shown in FIG. 6.

In accordance with another feature of the invention, the apparatus of the present invention may be arranged to provide a running tally of the area of parts cut from the workpiece. In this yield totalizer mode of use, because of the wide range of die areas, it is desirable to employ apparatus capable of storing and interpreting a relatively large number of different code "words" corresponding to scanner signals from different data designations. For this purpose, a storage register shown in FIG. 17 is provided, the register being arranged for operation in response to signals from the scanner temporarily to store up to 99 different words as received from the scanner and upon command to read out these words selectively in accordance with the code to operate the totalizing indicator. The words correspond to 99 different data designations which may be carried by the dies to denote different sizes thereof, suitably in increments of ½ sq. inch.

To this end, the storage register of FIG. 17 is arranged for connection to the four leads 56', 58', 60' and 66' by appropriate positioning of the switch 68 to store data in accordance with the occurrence of voltage pulses on the leads above a trigger threshold. The data designations carried by the dies are permutations of red, green and blue index areas and a magnet and are designed to cause the scanner to provide pulses on the leads 56', 58' and 60' in accordance with the colored index areas and to provide a pulse on the lead 66' when the designation comprises a magnet. It will be remembered that the scanning of the data designation in the form shown in FIG. 14 produces one pulse from a central index area and two pulses from each ring. According to the code, a red pulse has the value 1 and the storage register "remembers" up to four red pulses. A blue pulse has the value 5, a green pulse has the value 10, up to four of these being registered, and a pulse on the magnet lead 66' has the value 50. Thus, for example, three red pulses and a blue pulse correspond to the value 8 while two red pulses, three green pulses and a magnet pulse has the value 82.

Figure 18:
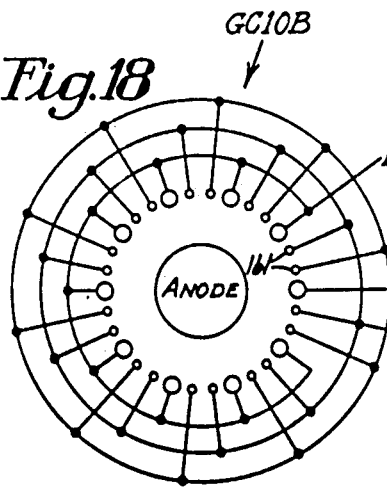
FIGS. 18, 19 and 20 are schematics of portions of the circuit shown in FIG. 17.
Figure 19:
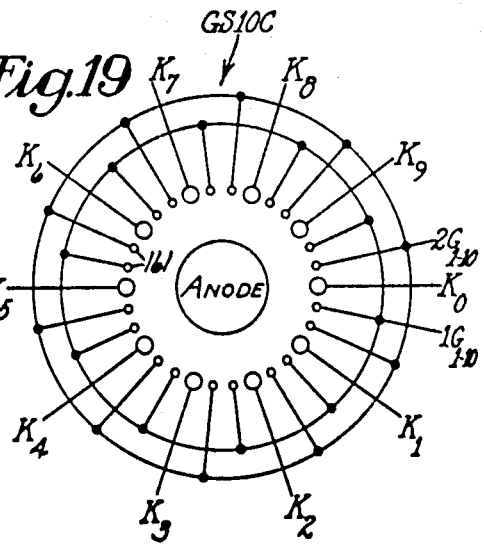
Figure 20:
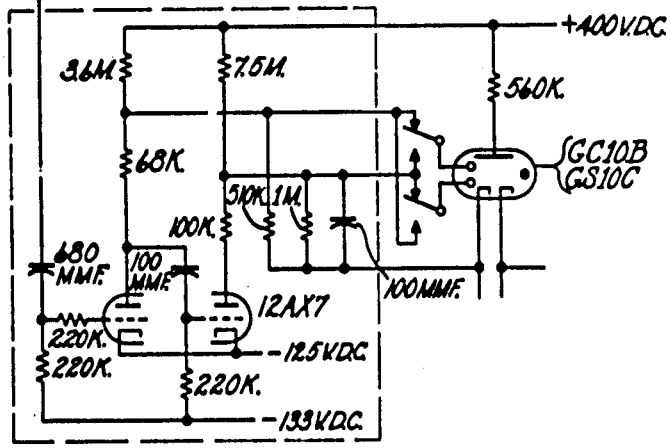

Referring now to FIG. 17, the counter-register comprises a plurality of cold cathode counting tubes 150, 152, 154, 156, 158 and 160 of the type manufactured by Baird-Atomic Inc., Cambridge, Mass., under the registered trademark "Decatron." Such tubes are glow tubes provided with a plurality of cathodes and other electrodes 161 (FIGS. 18 and 19) termed "guides" by which, under the control of conventional drive circuits 162, 164, 166, 168, 170 and 172, respectively, the tube discharge is transferred from one cathode to another in response to the application of pulses to the drive circuit. By reversing the connection of the guides to the drive circuit, the direction of transfer may be reversed. Suitable drive circuits are shown in the manual furnished with such tubes. FIG. 20 shows the drive circuit employed in FIG. 17 and the switch means for reversing the direction of count.

The counting tubes 150 and 156 for the red and green pulses, respectively, have such reversible connections between their guides and drive circuits while the other counting tubes do not. The reversing means include the armatures R1-2 and R1-3 of a relay R1 for the tube 150 and the armatures R2-2 and R2-3 of relay R2 in the case of the tube 156.

Each of the tubes 150, 154, 156 and 158 has 10 write out cathodes, nine of which are connected internally (see FIG. 18, K1-9) while the other cathode (K0, FIG. 18) is termed the "zero" cathode, and is connected to ground through a load resistor 174 while the common cathodes are connected to ground through a load resistor 176 and the normally closed contacts 178 of a reset switch 180. Actuation of the switch 180 lifts the common cathodes from ground causing the discharge to transfer to the zero cathode if not already there.

Each of the tubes 152 and 160 has ten separate cathodes, one of which, the zero cathode (K0, FIG. 19) is connected to ground through a load resistor while all the others (K1 through K9, FIG. 19) are connected through individual load resistors and the contacts 178 to ground for resetting the discharge to the zero cathode. It will be understood that the anodes of the tubes are supplied with D.C. voltage through a load resistor. Suitably the voltage is 400 volts via a 560K ohm resistor (not shown).

In storing a word received from the scanner, voltage pulses on the red lead 56' are supplied through the normally closed contacts R1-1a and the normally closed contacts R3-2a of a relay R3 to the drive circuit 162 to cause the glow discharge of the tube 150 to be transferred forwardly from its zero cathode by a number of cathodes corresponding to the number of pulses on the red lead which, according to the code, will be a maximum of four. The blue lead 58' is connected to the grid of a thyratron 182 having in its anode circuit a relay R4 and the normally closed contacts R5-1a of a relay R5 so that a pulse on the lead 58' is registered by firing the thyratron to cause the relay R4 to close the contacts R4-1b and R4-2b. Pulses received on the green lead 60' are supplied through the contacts R2-1a to the drive circuit of the tube 156 to register up to four such pulses in the same manner as the red pulses were registered. A pulse on the magnet lead 66' is registered by firing a thyratron 184 having in its anode circuit a relay K6 and the normally closed contacts R7-1a of a relay R7.

The data stored in the register is read out to a commercial A.C. operated stepping motor driven indicator 190 upon closure of a count or trip readout switch 192 arranged to be closed by actuation of the handle 20 of the clicker in initiating a cutting stroke. Closure of the switch 192 energizes a relay R8 which holds itself through contacts R8-3b while also closing the contacts R8-1b and R8-2b. Closure of the contacts R8-1b applies alternating current to the stepping motor of the counter indicator 190 through the lead 194 and any one of the contacts R3-1a, R4-1b, R9-1a or R6-1b. Initially, K3-1a and K9-1a will be closed. From the line, alternating current is supplied through a peaking circuit comprising a neon tube 196 to the storage register. The peaking circuit provides a positive pulse on each cycle of the alternating current and as will be explained in detail the number of pulses required to reset the storage register, which number is manifested by the indicator 190, represents the value of the data stored in the register. Closure of the contacts R8-2b supplies D.C. voltage from a B+ lead through a lead 198 which energizes the relay R1, supplies anode voltage through the relay R3 to a thyratron 200, supplies anode voltage through the relay R5 to a thyratron 202, energizes the relay R2, supplies anode voltage through the relay R9 to a thyratron 204, and supplies anode voltage through the relay R7 to a thyratron 206.

Energization of R1 reverses the connections of the guides of the tube 150 so that the tube will count backwards and also closes the contacts R1-1b. Energization of the relay K2 similarly causes the tube 156 to count backwards and closes the contacts R2-1b.

The count out pulses from the peaking circuit pass through the contacts R1-1b and R3-2a to the drive circuit 162 causing the tube 150 to count backwards. When the count returns to the zero cathode this cathode will swing positive because of the load resistor 174 and the grid of the thyratron 200 which is connected to the cathode will go positive firing the thyratron and energizing the relay R3. Upon energizing R3, the read-out pulses are transferred through the contacts R3-2b and, if a blue (5) pulse had energized R4, through R4-2b to the drive circuit of the tube 152 which accepts five pulses and then fires the thyratron 202 deenergizing R4. The pulses are now conducted via R4-2a and R9-2a to the tube 154 where they operate to transfer the discharge entirely around the tube. Each time the discharge reaches the zero cathode, a signal is transmitted over a lead 208 through the contacts R2-1b to cause the tube 156 to count backwards one step.

Accordingly, to bring the discharge in the tube 156 back to its zero cathode, it will be seen that the number of read-out pulses required is ten times the number stored in the tube and this number will be added by operation of the indicator 190 to the previously accumulated total. At the time the discharge returns to the zero cathode of the tube 156, this cathode will go positive and fire the thyratron 204 energizing the relay R9. This energization opens the contacts R9-1a and R9-2a and closes R9-2b. If a magnet pulse (value 50) is registered by the firing of the thyratron 184, the contacts R6-1b and R6-2b will be closed, and read-out pulses will be furnished to the drive circuit 170 of the tube 158 while the energization circuit to the indicator 190 will remain closed to permit it to count the read-out pulses. The tube 158 is cascaded with the tube 160 and its drive circuit 172 so that upon each tenth pulse a pulse is transmitted to the drive circuit 172. After 50 read-out pulses have been received by the drive circuit 170, the discharge in the tube 160 reaches the fifth cathode connected to the grid of the thyratron 206 and fires it. The resulting energization of the relay R7 opens the circuit of R6 so that the contacts R6–1b and R6–2b are opened and the indicator 190 stops counting.

In the operation of the hereinbefore described apparatus to indicate the number of cuts made with individual dies, the operator first selects the dies needed for a work order and attaches an identifying index tag to each. Each index tag controls the operation of one of the counters 34 which may be identified if desired by markings indicative of the data designation carried by the index tag. It is assumed that the switch 68 is positioned to transmit the signals from the scanner to the counter circuits and that the relay logic circuit corresponds with the code chosen for the data designations. With the circuits warmed up and ready for operation, the operator places a workpiece on the support 12 and positions a die in the usual course of operation. He then brings the beam 16 from its rest position to the right rear of the support over the die, passing the scanner 38 over the index tag. The electric circuits then operate as discussed hereinabove to register the data encoded on the index tag by the data designation. Upon actuation of the handle 20, the counter corresponding to that index tag is caused to move one interval. Where the counters are preset to the numbers on the work ticket, the indicators will then show a number of cuts remaining and when a counter shows zero the operator will put aside that die.

The operation of the apparatus in the yield totalizer mode is of course similar except that the indicator 190 is operated by the clearing out of the storage register. Thus, if a second cut is made with the same die it will be necessary for the operator to swing the beam once more over the index tag.

Having thus described my invention, what I claim as new and desire to secure by Letters Patent of the United States is:

1. In a press for cutting parts from sheet material by pressing cutting dies through the material, the press having a work support, a swing beam, power means for moving the beam toward the support in a cutting stroke, and manually-operated trip means for initiating cutting strokes, in combination, light-responsive means carried by the beam for sensing color-coded data designations carried by the dies when positioned on the work support, and an indicator controlled by the sensing means for manifesting the data embodied in the sensed data designations.

2. In a press for cutting parts from sheet material by pressing cutting dies through the material, the press having a work support, a swing beam, power means for moving the beam toward the support in a cutting stroke, and manually-operated trip means for initiating cutting strokes, in combination, light-responsive means carried by the beam for sensing color-coded data designations carried by the dies when positioned on the work support, a storage register controlled by the light-responsive means for storing the data embodied in a sensed data designation, and an indicator controlled by said register and by said trip means for manifesting the data stored in the register upon operation of said trip means.

3. In a press for cutting parts from sheet material by pressing cutting dies through the material, the press having a work support, a swing beam, power means for moving the beam toward the support in a cutting stroke, and manually-operated trip means for initiating cutting strokes, in combination, light-responsive means carried by the beam for sensing color-coded data designations carried by the dies when positioned on the work support, a storage register controlled by the sensing means for storing the data embodied in a sensed data designation, and an indicator comprising a plurality of counters selectively operated under the joint control of the storage register and the trip means for tallying the production of the press in terms of the number of different parts cut.

4. In a press for cutting parts from sheet material by pressing cutting dies through the material, the press having a work support, a swing beam, power means for moving the beam toward the support in a cutting stroke, and manually-operated trip means for initiating cutting strokes, in combination, light-responsive means carried by the beam for sensing color-coded data designations carried by the die when positioned on the work support, a storage register controlled by the sensing means for storing the data embodied in a sensed data designation and an indicator comprising a counter selectively operated under the control of the storage register and the trip means for tallying the production of the press in terms of the total area of parts cut.

5. In a press for cutting parts from sheet material by pressing cutting dies through the material, the press having a work support, a swing beam, power means for moving the beam toward the support in a cutting stroke, and manually-operated trip means for initiating cutting strokes, in combination, a scanner carried by the beam, said scanner including a source of ultraviolet light for illuminating fluorescent color-coded data designations carried by dies when positioned on the work support and light-responsive means for sensing said data designations, and an indicator controlled jointly by the sensing means and by said trip means for manifesting the data embodied in the sensed data designations.

6. In a press for cutting parts from sheet material by pressing cutting dies through the material, the press having a work support, a swing beam, power means for moving the beam toward the support in a cutting stroke, and manually-operated trip means for initiating cutting strokes, in combination, a scanner carried by the beam, the scanner comprising a source of ultraviolet light for illuminating fluorescent color-coded data designations carried by dies from the work support, said source being amplitude modulated at a predetermined frequency, the scanner also including a plurality of photocells each provided with filter means selectively transmitting one color of the data designation color code, a storage register controlled by the photocells for storing the data embodied in a sensed data designation, and an indicator controlled jointly by a storage register and the trip means for manifesting the data embodied in a sensed data designation.

7. In apparatus for cutting out parts from sheet material by pressing freely movable cutting dies through the material, said die carrying a data designation comprising fluorescent material identifying the die in accordance with a predetermined code of colored areas, a cutting press having a fixed cutting surface, a presser member mounted for swinging over the cutting surface, power means for moving the presser member toward the cutting surface in a cutting stroke and manually-operated trip means controlling the power means for initiating a cutting stroke, in combination, a scanner comprising a source of radiant energy for exciting the fluorescent material of a data designation of a die positioned on the cutting surface, and a plurality of photocell devices each selectively responsive to radiant energy at the wave length of one of the colors of the data designation color code, said scanner being mounted on the presser member for relative movement in operative relation between said photocell device and data designations associated with dies disposed on the cutting surface during swinging movement of the presser member over the cutting surface, a plurality of output circuits, one for each color of the code, selectively energized under the control of the photocell devices to provide output signals in accordance with the sensed data designations, a storage register controlled by the output signals for storing the data embodied in said signals and an indicator controlled by said register and by said trip means for manifesting the data stored in the register upon operation of said trip means.

References Cited in the file of this patent

UNITED STATES PATENTS

| | | |
|---|---|---|
| 2,192,244 | Schlesinger | Mar. 5, 1940 |
| 2,337,629 | Shortell | Dec. 28, 1943 |
| 2,425,082 | Bolston | Aug. 5, 1947 |
| 2,473,942 | Dehn | June 21, 1949 |
| 2,592,264 | Fultz | Apr. 8, 1952 |
| 2,690,803 | Wallace | Oct. 5, 1954 |
| 2,791,273 | Brownell | May 7, 1957 |
| 3,099,749 | Williams | July 30, 1963 |